United States Patent [19]

Sheiman et al.

[11] 4,235,515
[45] Nov. 25, 1980

[54] STEREOSCOPIC VIEWING SYSTEM

[76] Inventors: David M. Sheiman, 2005 Robinson St.; Elliot A. Rudell, 2422 Curtis Ave., both of Redondo Beach, Calif. 90278

[21] Appl. No.: 920,280

[22] Filed: Jun. 29, 1978

Related U.S. Application Data

[63] Continuation-in-part of Ser. No. 632,224, Nov. 17, 1975, abandoned.

[51] Int. Cl.³ .................... G02B 27/14; G02B 27/24
[52] U.S. Cl. .................................. 350/138; 350/174; 350/286
[58] Field of Search ............... 350/131, 137, 138, 133, 350/144, 173, 211

[56] References Cited

U.S. PATENT DOCUMENTS

| 51,906 | 1/1866 | Swan | 350/174 |
| 3,003,391 | 10/1961 | Land | 350/173 |
| 3,677,621 | 7/1972 | Smith | 350/173 X |
| 3,972,596 | 8/1976 | Baumgardner et al. | 350/286 |

FOREIGN PATENT DOCUMENTS 711367  6/1954  United Kingdom ..................... 350/137

OTHER PUBLICATIONS

Culver, et al., "Two Color Optical Alignment System," *IBM Technical Disclosure Bulletin*, vol. 17, No. 10, Mar. 1975, p. 2983.

*Primary Examiner*—John K. Corbin
*Assistant Examiner*—Scott J. Sugarman
*Attorney, Agent, or Firm*—Robert E. Strauss

[57] ABSTRACT

There is disclosed a stereoscopic viewing system utilizing one or two prisms to direct the line of sight from a viewer's eyes to each of a pair of stereoscopic images. The single lens sytem employs different occluded angles between the prism faces and the facing image planes to avoid lateral distortion of the images. In the preferred embodiment, the prisms have a plano face and an opposite face bearing a plurality of equally-spaced, straight and parallel V-grooves, forming a plurality of equally-spaced, longitudinal triangular prisms therebetween. The preferred viewing system employs, in the simplest embodiment, one of these prisms mounted with its grooved face at an occluded angle of from 40° to about 60° to one of a pair of stereoscopic images. The second stereoscopic image is mounted on a planar imaging surface at an occluded angle of from 2° to about 15° to the plano face of the prism. A viewer perceives a stereoscopic impression when the incident angle of view from one eye results in complete internal reflection in the prism and is directed to one of the pair of stereoscopic images. The view from the opposite eye, however, is refracted in the prism and directed to the other of the stereoscopic images. In the second embodiment, a pair of the aforementioned prisms are disposed with their planar surfaces in a back-to-back array and the occluded angles between each of the stereoscopic image planes and the lens assembly are equal and from 40° to about 60°.

16 Claims, 11 Drawing Figures

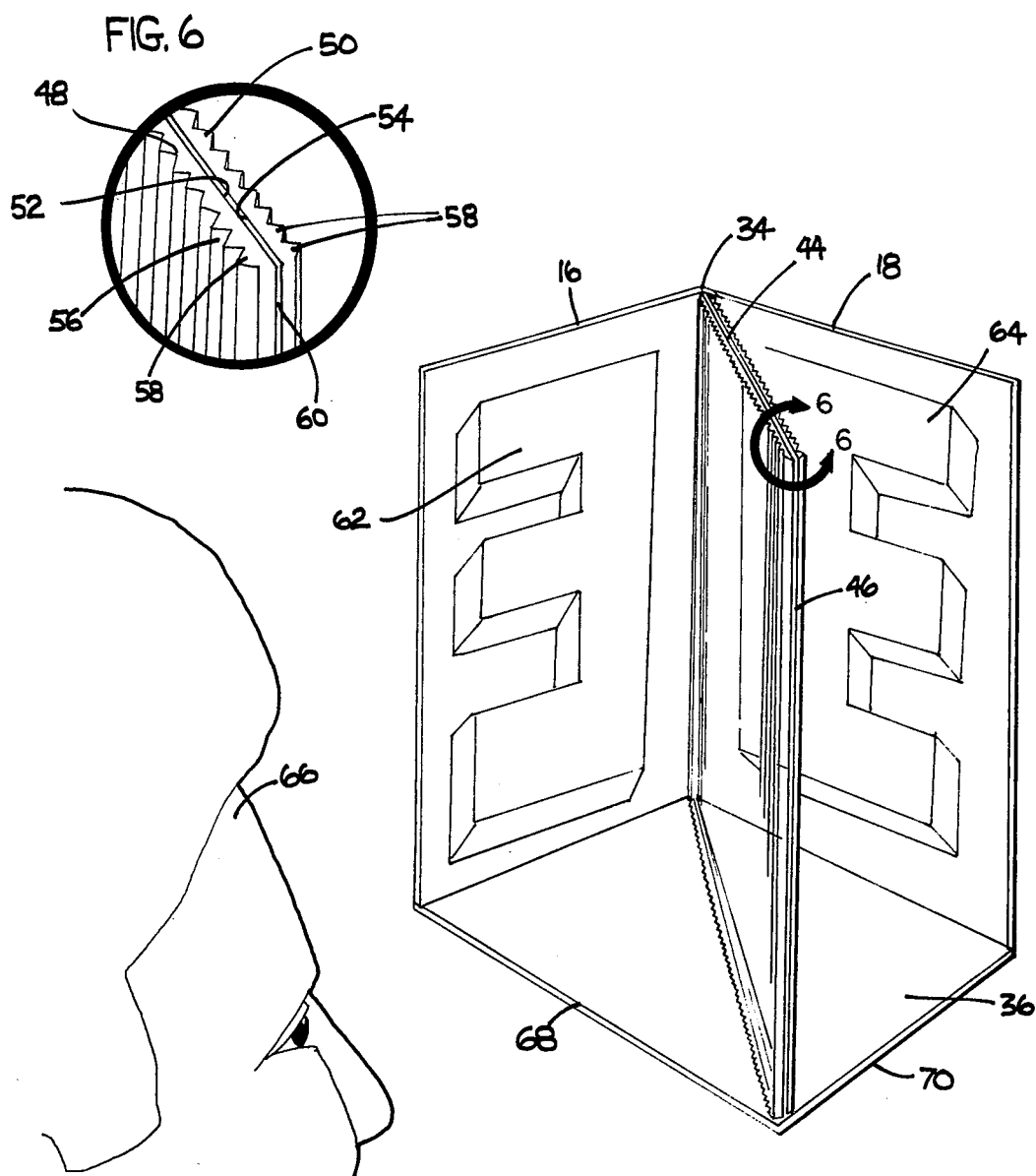
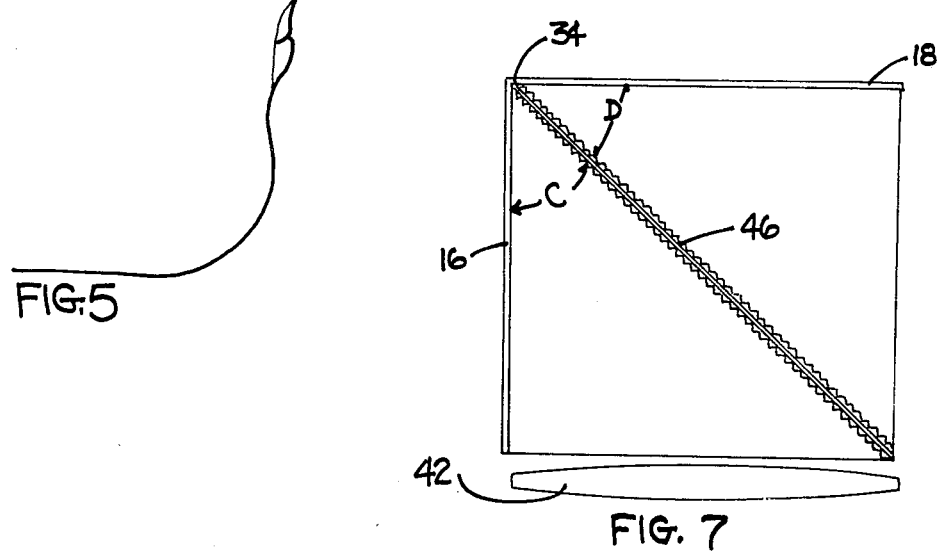

STEREOSCOPIC VIEWING SYSTEM

REFERENCE TO RELATED APPLICATIONS

This application is a continuation-in-part of our copending application, Ser. No. 632,224, filed on Nov. 17, 1975, now abandoned.

BACKGROUND OF THE INVENTION

1. Field of the Invention

This invention relates to a system for the display and viewing of stereoscopic images.

2. Brief Statement of the Prior Art

Various techniques have been employed for the stereoscopic display and observation of optical images including hand-held viewers held up to the observer's eyes in which a separately imaged view of the object is mechanically directed to each of the eyes and, more recently, stereoscopic projection systems employing projectors for directing stereoscopic, image-modulated, parallel beams of polarized light onto a screen viewed by observers wearing special eyepieces having oculars of polarizing material oriented to different planes and effective only to transmit light from its respective image-modulated, polarized light beam.

An ancient patent, U.S. Pat. No. 51,906 of Jan. 2, 1866, discloses a stereoscopic viewing assembly of a massive pair of prisms. This device, while operable, is not practical because of the extreme size and bulk of the device, with a consequential high cost of manufacture, and because the assembly requires backlighted images, e.g., transparencies.

BRIEF STATEMENT OF THE INVENTION

This invention comprises a stereoscopic viewing system that uses one or a pair of prisms to direct the line of sight from each eye to one of a pair of stereoscopic images. The preferred system is very portable and inexpensive and simple to manufacture and can utilize incident light and does not depend on the use of special eye pieces and the like to be worn by the viewer. The preferred system comprises the use of one or two prisms having a plano face and an opposite, V-grooved face in which a plurality of parallel, longitudinal and equally-spaced, V-grooves define a plurality of parallel, longitudinal triangular prisms. The prism is used in combination with a pair of stereoscopic images which are positioned in side-to-side reversed order on imaging planes having a common intersection with the plane of the viewing prism. In the single prism embodiment, the grooved face of the prism has an occluded angle with regard to one of the pair of imaging planes from 40° to about 60° while the plano face of the prism has an occluded angle from 2° to about 15° to the other imaging plane.

In the two prism embodiment, a pair of the grooved viewing prisms are positioned with their plano surfaces in a back-to-back array and their grooved surfaces facing the respective one of the pair of stereoscopic images. In this embodiment, the occluded angles between the prisms and the stereoscopic images are equal and are from 40° to 60°.

The stereoscopic effect is achieved since the slight convergence of sight from the viewer's eyes permits an incident angle of view from one eye which is within the angle for complete internal reflection of the prism, permitting the view to be directed toward one of the pair of images, while the view from the other eye is outside the angle for complete internal reflection and is refracted through the prism and directed to the other of the stereoscopic images.

BRIEF DESCRIPTION OF THE DRAWINGS

The invention will be described with reference to the FIGURES of which:

FIG. 5 is a perspective view of the two prism embodiment;

FIG. 6 is an enlarged view of a portion of FIG. 5;

FIG. 7 is a planar view of the system of FIG. 5;

DESCRIPTION OF PREFERRED EMBODIMENTS

Figure 2:
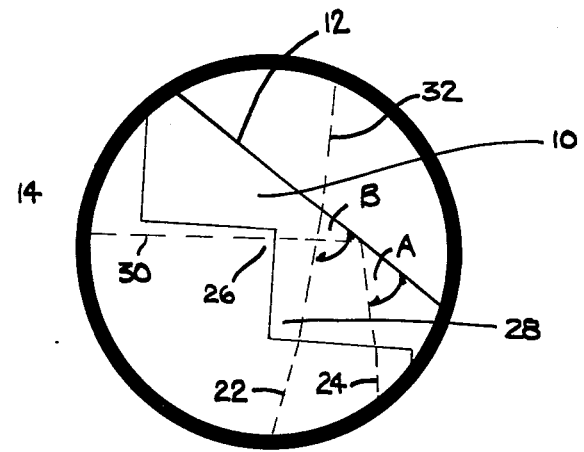
FIG. 2 is an enlarged view of a portion of FIG. 1, illustrating the lines of sight of a viewer.
Figure 1:
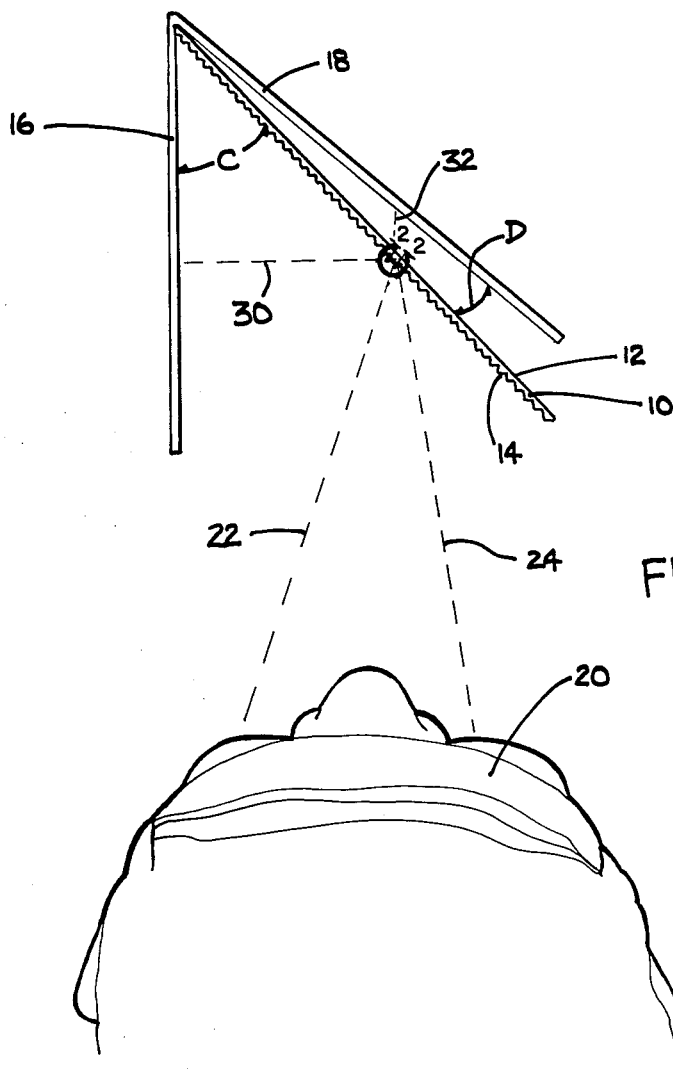
FIG. 1 illustrates the simple, one prism embodiment.

Referring now to FIGS. 1 and 2, the simple, one prism system of the invention is disclosed. As there illustrated, a prism 10 is provided having a flat or plano surface 12 and an opposite grooved face 14. The prism is mounted with one edge coextensive with and intersecting the edges of imaging planes 16 and 18 which provide for imaging of right and left views of a stereoscopic pair of views. Prism 10 has its surface 14 provided with a plurality of longitudinal V-grooves 26 that define therebetween a plurality of parallel, longitudinal, triangular prisms 28 in regular and equal spacing across the surface 14. The stereoscopic display is observed by a viewer 20 whose line of sight is directed onto the grooved surface 14 of the prism 10. The lines of sight of the left and right eyes of the viewer are shown in broken lines 22 and 24 for the left and right eyes, respectively, in FIG. 2.

The observer can assume a position with regard to the prism 10 whereby the line of sight 24 from the right eye has an incident angle A with regard to prism 10 which is below the angle for complete internal reflection whereby this line of sight is internally reflected by the plano surface 12 of the lens and exits from the prism along line 30. The line of sight from the opposite eye, broken line 22, however, has an angle B greater than the angle for complete internal reflection and this line of sight is reflected within the prism 10 and exits therefrom along the direction 32.

Referring now to FIG. 1, the line of sight 30 is directed to the right stereoscopic image which is displayed on imaging plane 16 while line of sight 32 is directed to the left stereoscopic image which is displayed on imaging plane 18.

The relative occluded angles of the imaging surfaces with respect to the grooved prism are selected to minimize prism distortion in the single prism system. For this purpose, angle C which is the occluded angle between the grooved surface 14 of prism 10 and the facing imaging plane 16, should be from about 40° to about 60° while angle D, the occluded angle between the plano surface 12 of prism 10 and the facing imaging plane 18, should be from about 1° to about 15°.

Figure 3:
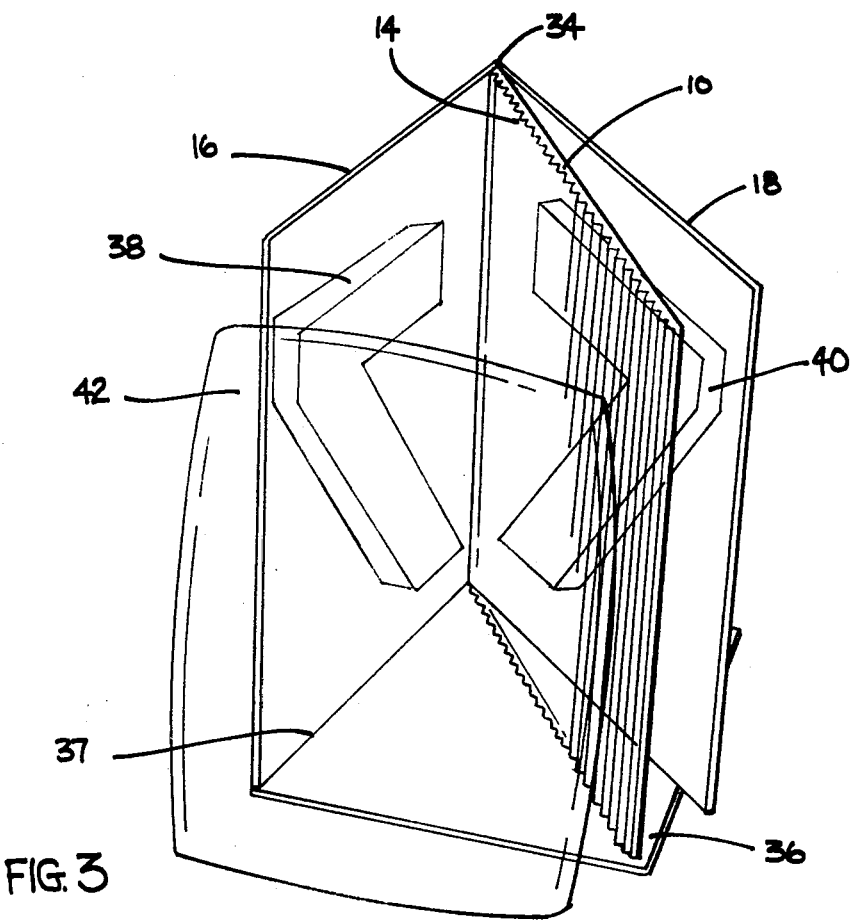
FIGS. 3 and 4 are views of the one prism embodiment utilizing a magnification lens.

Referring now to FIG. 3, the single prism viewing system is shown in greater detail. In this illustration, the imaging planes 16 and 18 have a common longitudinal intersection 34. The prism 10 shares this intersection so that the assembly can be simply provided as a folding book with the prism 10 between the imaging planes 16 and 18. The illustrated embodiment has a base plate 36 for supporting the assembly. This can be attached to the backing for imaging plane 16 and can fold along line 37. The prism 10 has a grooved surface 14 wherein the plurality of V-grooves or channels define a plurality of equally spaced, longitudinal, right angle prisms which are parallel to the common intersection 34 of the prism plane and the imaging planes. The right and left stereoscopic images, 38 and 40 are displayed on the imaging planes 16 and 18. Image 38 is a flopped image.

In a preferred embodiment, a simple magnification lens 42 is mounted or otherwise supported in the line of sight from the viewer to the grooved surface 14 of the viewing prism. The lens 42 is desirable since it not only provides magnification but, in addition, increases the distance between the viewer and the lens at which the stereoscopic effect can be observed. In a typical application with a prism 10 having dimensions of 5×5 inches, the normal viewing distance for observing the stereoscopic effect is from 6 to about 18 inches from the prism 10. The magnification lens 42 increases this distance such that a stereoscopic effect can be observed anywhere from 6 to about 36 inches, thereby increasing the versatility of the system.

Figure 4:
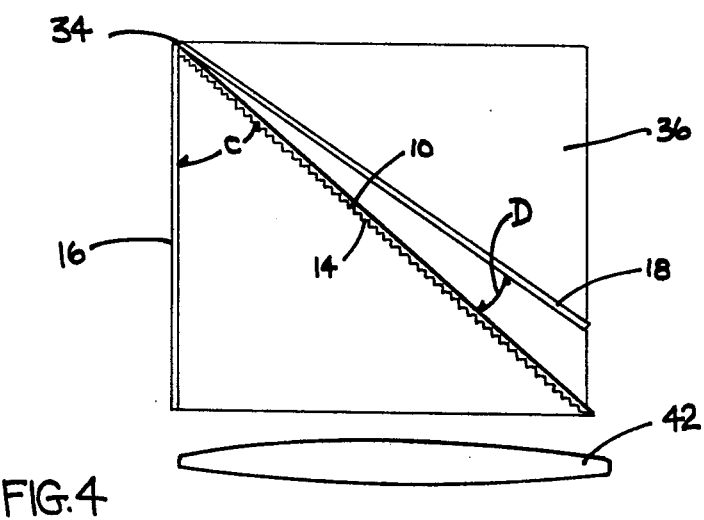

The illustration in FIG. 4 shows the relative angles of the elements in the viewing system. The imaging plane 18 is shown with the occluded angle D of from 2° to about 15° to the plano surface 12 of lens 10 while the imaging plane 16 is shown with an occluded angle C of from 40° to about 60°, preferably 45°, to the grooved face 14 of prism 10. The magnification lens 42 can be hand held or can be positioned by supports as desired.

Referring now to FIGS. 5-7, the preferred stereoscopic viewing system will be described. As there shown, a pair of imaging planes 16 and 18 have a common intersection 34 which is also intersected by the plane 44 of the viewing prism assembly generally indicated at 46. The assembly can be mounted, if desired, on a base plate 36 such as previously described.

The prism assembly 46 comprises a pair of prisms 48 and 50 which, as shown in FIG. 6, are positioned with their plano surfaces 52 and 54 in a back-to-back contiguous array. Each prism is of the shape previously described with regard to prism 10 of FIGS. 1-4 and each has its outer face grooved with a plurality of regularly spaced, longitudinal V-grooves 56 which define a plurality of longitudinal, regularly and equally-spaced, triangular prisms 58 therebetween. The plano surfaces 52 and 54 of the prisms are separated by a thin gap 60. It has been found that a normally polished optical surface has sufficient irregularities to permit the two prisms to be placed in direct face contact and there still exists a sufficient interruption in the medium to permit complete internal reflection necessary to achieve the stereoscopic effect. Alternatively, a separation gap 60 can be provided with a thickness up to about 0.5 inches or greater as desired.

The pair of stereoscopic images 62 and 64 are mounted on the right and left stereoscopic imaging planes 16 and 18 in any suitable fashion. These images can be opaque prints of stereoscopic views or can be transparencies or received projections from a remote transparency or film projector. Image 62 is a mirrored or flopped right image.

The viewer 66 in FIG. 5 observes the stereoscopic images by directing his line of sight onto the grooved surface of either of the two grooved prisms 48 and 50 of the prism assembly. This permits viewers to observe the stereoscopic display from adjacent sides 68 and 70 of the viewing system, however, the observers will observe a reversal in the side to side relationship of the display in transferring from side 68 to side 70.

As shown in FIG. 7, the prism assembly 46 lies on a plane 44 which shares the common intersection 34 with the viewing planes 16 and 18 in the stereoscopic display system. In the embodiment shown in FIGS. 5-7 wherein a pair of prisms are employed, the angles A and B occluded between the grooved faces of the prisms and the respective facing stereoscopic imaging planes 16 and 18 are equal. These angles can be from 40° to about 60°, preferably 45°, as shown in FIG. 7. Also, as shown in FIG. 7, the system can be employed with a magnification lens 42 along side 68 and/or 70 which provides the advantages of magnification and also of increasing the permissible stereoscopic viewing distance.

The longitudinally grooved prisms which are employed in the invention have a plurality of parallel and equally-spaced V-grooves coextensive with their length. These grooves can be provided at any suitable frequency, typically from 10 to about 200 lines per inch. The resolution of the eye is such that when the grooves are at a spacing of at least 50 per inch, the eye loses the impression of vertical lines extending along the view and, accordingly, it is preferred that the prisms have the density of these grooves of at least about 50 per inch.

The grooved prisms employed in the invention can be formed of any optically clear material such as glass or, preferably, can be formed of relatively inexpensive clear plastics such as acrylics and polycarbonates. These prisms can be molded using accepted techniques for achieving optical clarity in the finished products.

The assembly of the imaging plans and prisms are very portable and can be inexpensively manufactured. The systems completely eliminate the necessity for any special eyepiece or viewing apparatus to be worn by the viewer. The systems also permit the use of opaque images on the imaging planes since the images can be front lighted. The use of the two prism configuration as shown in FIGS. 5-7 provides a simple viewing system which is free of prism distortion and which has a relatively wide angle of view for perceiving stereoscopic displays. While the system as illustrated herein is shown as a relatively portable and small unit, the effect can be readily achieved in large displays as well as to displays with motion picture film strips of stereoscopic transparencies that can be projected onto the imaging planes 16 and 18.

Figure 8:
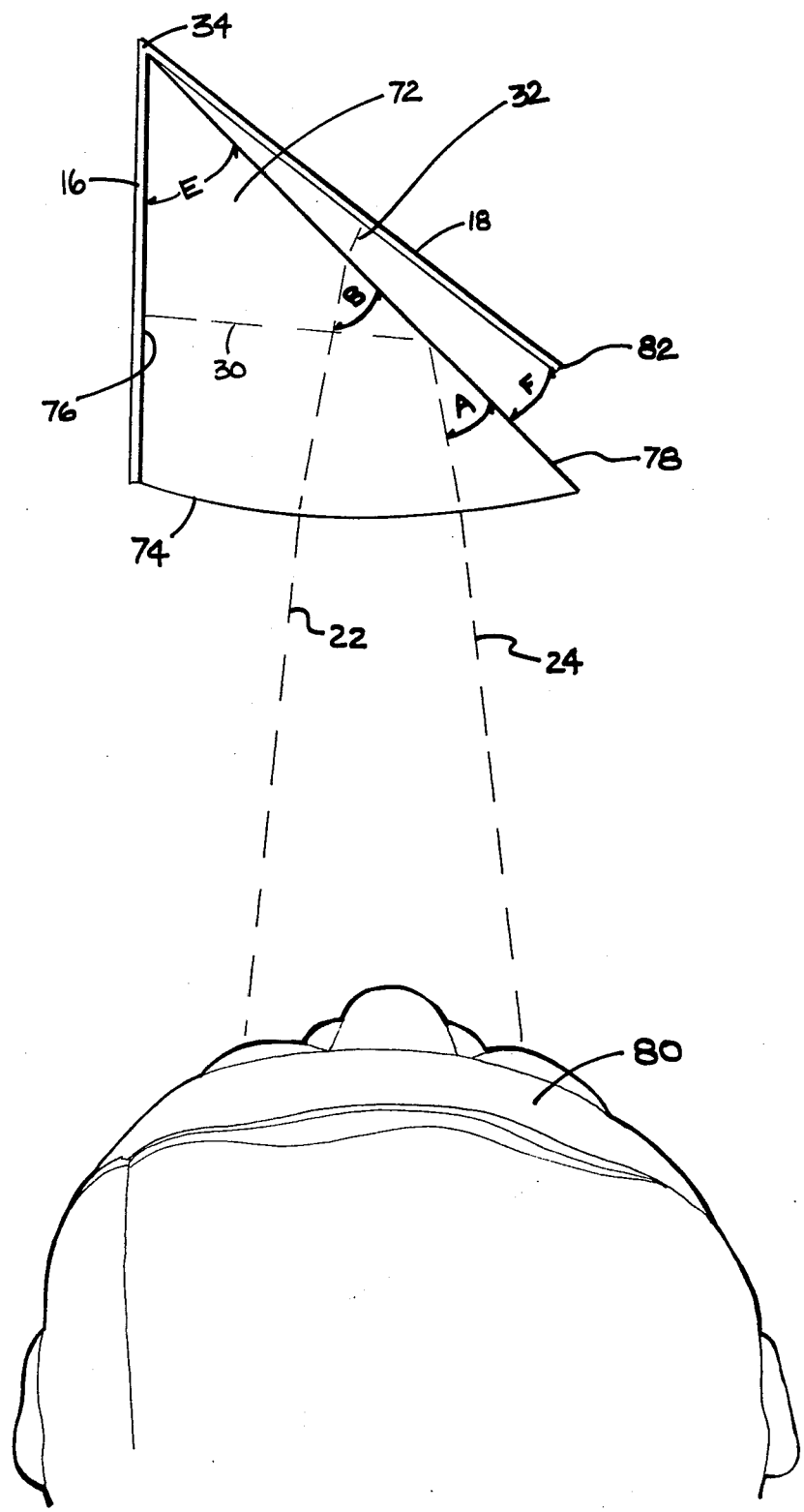
FIG. 8 is a planar view of a single, solid prism system.

The stereoscopic effect disclosed herein for the grooved face prism can also be achieved with a single solid prism. FIG. 8 illustrates this application. As there illustrated, a single, solid prism 72 is shown between imaging planes 16 and 18. The front face 74 of this prism can be plano or, preferably is convex in the manner shown in FIG. 8. The occluded angle E, which is positioned at the intersection 34 of the imaging planes 16 and 18, can be from about 35° to 60°, preferably from about 40° to 45°. The imaging plane 16 is positioned along the plano face 76 of prism 72 while the imaging plane 18 is positioned with an occluded angle F from 1° to about 15° to the opposing plano face 78 of prism 72. The stereoscopic effect is achieved when the viewer 80 directs his line of sight onto prism 72 at such an angle that the incident angle A of the line of sight 24 from the right eye is equal to or less than the angle for complete internal reflection, thereby reflecting the line of sight along line 30 onto the right stereoscopic image on imaging plane 16. The line of sight 22 from the left eye, however, has an incident angle B with face 78 of prism 72 which is greater than the angle for complete internal reflection and this line of sight is refracted and directed along line 32 to the left stereoscopic image on imaging plane 18.

The invention comprises positioning of the imaging plane 18 relative to prism 72 whereby the lateral distortion, which is believed to be caused by prism dispersion is reduced to a point where it is not readily perceptible. The lateral distortion which occurs when angle F is substantially above about 15° comprises an unequal magnification of the image in a lateral direction, the degree of relative magnification increasing along the distance from the lateral edge 82 to the intersection 34.

As previously mentioned, the stereoscopic display of the images on the imaging planes 16 and 18 requires the mirror and side-to-side reversal of the images such that the right mirrored stereoscopic image is displayed on the left hand imaging plane 16 while the left stereoscopic image is displayed on the right hand imaging plane 18. This side-to-side and mirror reversal of the images can be corrected by various systems illustrated in FIGS. 9–11.

Figure 9:
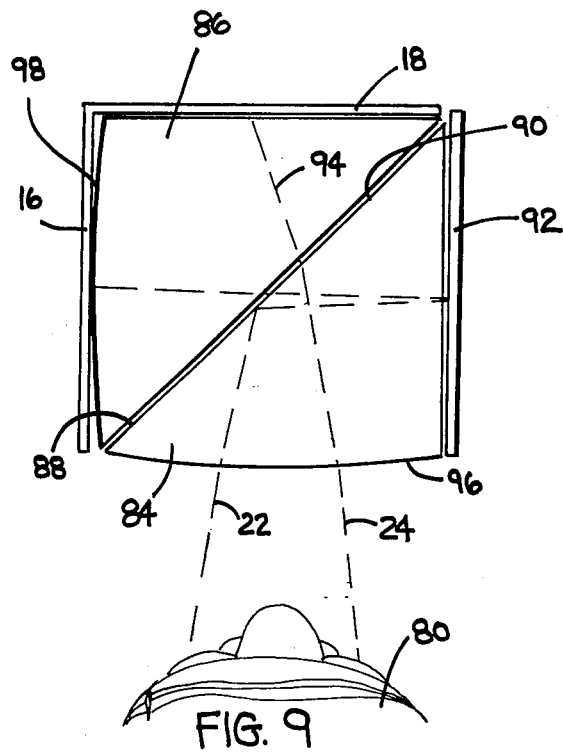
FIGS. 9-11 are views of two, solid prism systems having special features.

Referring to FIG. 9, the system is disclosed with a pair of prisms 84 and 86 which can be identical in shape, thereby minimizing manufacturing costs. The prisms are positioned with their hypotenuse sides in face-to-face array with a gap or spacing 88 to provide the interruption in medium necessary for the internal reflection. In this application, the viewer 80 perceives a stereoscopic effect since the line of sight 22 from the left eye is internally reflected by surface 90 of prism 84 and is directed onto a mirror 92 that reflects the line of sight to the imaging plane 16 on which is displayed the left stereoscopic image. The line of sight 24 from the right eye is refracted through prism 84, exiting therefrom and is refracted as line 94 through prism 86 onto the right stereoscopic image that is displayed on imaging surface 18. The use of the mirror 92 can thus be seen to permit the use of the stereoscopic images in their normal side-by-side relationship without the side-to-side reversal as in the previously described systems.

In the preferred embodiment, the front, viewing surface 96 of prism 84 is slightly convex to provide a magnification that increases the permissible distance from the surface of the prism for observing a stereoscopic display. Prism 86 which is identical to prism 84 also has a convex face 98 which is opposed to imaging surface 16. This provides a magnification of the image on plane 16 that compensates for the slightly greater line of sight of this image than for the right image appearing on imaging plane 18.

Figure 10:
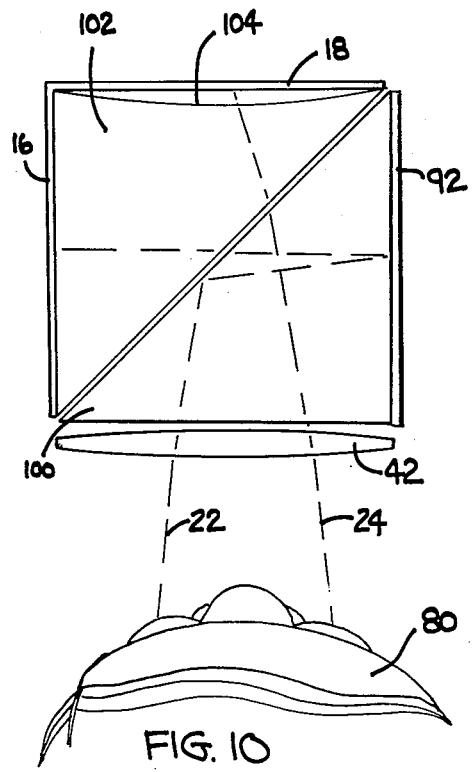

FIG. 10 illustrates a similar system employing prisms 100 and 102, imaging planes 16 and 18 and a mirror 92. The lines of sight 22 and 24 from viewer 80 are as previously described. The embodiment of FIG. 10 illustrates an alternative embodiment to that of FIG. 9 in that prism 102 is provided with a concave face 104 opposite imaging plane 18, thereby correcting for the slightly lesser length of line of sight to the right image than the line of sight to the left image whereby the images are perceived as equal in size and shape. Lens 42 is used in the manner previously described to provide for a greater permissible spacing from viewer 80 to the viewing surface of prism 100.

Figure 11:
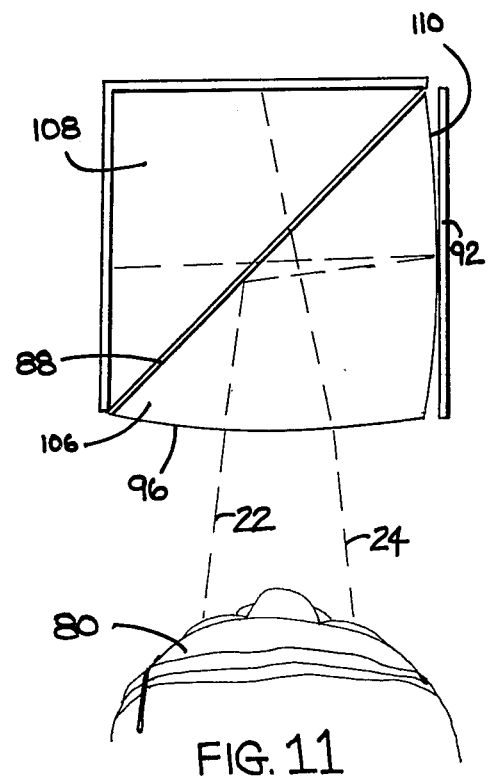

FIG. 11 illustrates yet another alternative embodiment to the system shown in FIGS. 9 and 10. As there illustrated, prisms 106 and 108 are separated by a slight gap or separation 88. Prism 106 has a convex surface 96 similar to the surface described with reference to prism 84 of FIG. 9. The prism also has a convex surface 110 which is opposite the mirror 92. This convex surface functions as a magnification means to compensate for the slightly greater distance in line of sight 22 than for line of sight 24 whereby the viewer 80 perceives the images in equal sizes and shapes.

In the applications of FIGS. 9–11, the systems are observed in a darkened room to minimize any reflection of the viewer's face from the system so the viewer perceives the stereoscopic images. These images are preferably backlighted transparencies.

The invention has been described with reference to the presently preferred and illustrated embodiment. It is not intended that the invention be unduly limited by this description of preferred embodiments. Instead, it is intended that the invention be defined by the means, and their equivalents, set forth in the following claims:

What is claimed is:

1. A stereoscopic viewing system comprising:
   (a) a triangular prism bearing, on one face, a plurality of parallel, longitudinal and laterally spaced-apart, straight line V-grooves defining a plurality of straight, longitudinal and laterally spaced-apart triangular prisms and an opposite plano face;
   (b) a first stereoscopic imaging surface at an occluded angle to said one face from 40° to about 60°; and
   (c) a second stereoscopic imaging surface at an occluded angle to said plano face from 1° to about 15°; said prism and imaging surfaces lying along planes having a common intersection parallel to said grooves of said prism.

2. The stereoscopic viewing system of claim 1 wherein said prism is aligned with said grooves and interspaced prisms parallel to the vertical axis of said imaging planes.

3. The stereoscopic viewing system of claim 1 wherein said occluded angle between said first imaging plane and prism is about 45°.

4. The stereoscopic viewing system of claim 1 including a pair of side-to-side reversed stereoscopic images on said imaging planes with one of said images mirrored.

5. The stereoscopic viewing system of claim 1 including a magnification lens in front of said prism, in the line of sight of a viewer thereof.

6. The stereoscopic viewing system of claim 1 wherein said V-grooves are provided at a density from about 10 to 200 per inch.

7. The stereoscopic viewing system of claim 1 wherein said V-grooves are provided at a density of at least 50 per inch.

8. The system of claim 1 wherein said triangular prisms are at equal, lateral spacings.

9. A stereoscopic viewing system comprising:
   (a) a pair of prisms with back-to-back, continuous plano faces lying along a common prism plane and opposite prism faces, each prism face bearing a plurality of parallel, equally-spaced, straight-line, V-grooves defining a plurality of straight, equally-spaced triangular prisms; and (b) first and second imaging surfaces lying on first and second imaging planes having a common intersection with said prism plane and positioned at substantially equal occluded angles, from about 40° to 60° between said prism plane and each of said imaging surfaces.

10. The stereoscopic viewing system of claim 9 wherein the occluded angles between said imaging planes and said prism plane are about 45°.

11. The stereoscopic viewing system of claim 9 including a pair of side-to-side reversed stereoscopic images on said imaging surfaces.

12. The stereoscopic viewing system of claim 9 including a magnification lens in front of said prism, in the line of sight of a viewer thereof.

13. The stereoscopic viewing system of claim 9 wherein said V-grooves are provided at a density from about 10 to 200 per inch.

14. The stereoscopic viewing system of claim 9 wherein said V-grooves are provided at a density of at least 50 per inch.

15. A stereoscopic viewing system comprising:
(a) a triangular prism having a viewing face and right and left imaging faces with an apex angle between said imaging faces from 35° to about 60°;
(b) a first stereoscopic imaging surface along the first of said prism imaging faces;
(c) a second stereoscopic imaging surface at an occluded angle from 1° to about 15° to said second of said prism imaging faces; and
(d) a set of stereoscopic images, in reversed, side-to-side position on said imaging surfaces with one of said images mirrored.

16. The stereoscopic viewing system of claim 15 including a magnification lens in front of said viewing face.

* * * * *